United States Patent
Nair et al.

(10) Patent No.: US 11,481,158 B2
(45) Date of Patent: Oct. 25, 2022

(54) ENABLING COMPRESSION BASED ON QUEUE OCCUPANCY

(71) Applicant: INTERNATIONAL BUSINESS MACHINES CORPORATION, Armonk, NY (US)

(72) Inventors: Prashant Nair, Elmsford, NY (US); Seokin Hong, Chappaqua, NY (US); Michael Healy, Cortlandt Manor, NY (US); Bulent Abali, Tenafly, NJ (US); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/210,708

(22) Filed: Dec. 5, 2018

(65) Prior Publication Data
US 2020/0183620 A1 Jun. 11, 2020

(51) Int. Cl.
*G06F 3/06* (2006.01)

(52) U.S. Cl.
CPC ............ *G06F 3/0661* (2013.01); *G06F 3/064* (2013.01); *G06F 3/0608* (2013.01); *G06F 3/0659* (2013.01); *G06F 3/0673* (2013.01)

(58) Field of Classification Search
CPC ...... G06F 3/0661; G06F 3/0608; G06F 3/064; G06F 3/0659; G06F 3/0673
See application file for complete search history.

(56) References Cited

U.S. PATENT DOCUMENTS

| | | | |
|---|---|---|---|
| 5,864,538 A * | 1/1999 | Chong | H04L 12/5602 370/236.1 |
| 6,370,631 B1 | 4/2002 | Dye | |
| 8,166,260 B2 * | 4/2012 | Prabhu | G06F 3/0608 711/161 |
| 2002/0124142 A1 | 9/2002 | Har | |
| 2005/0114601 A1 | 5/2005 | Ramakrishnan | |
| 2006/0026342 A1 * | 2/2006 | Calvignac | G06F 13/1642 711/105 |
| 2006/0129728 A1 | 6/2006 | Hampel | |
| 2008/0055323 A1 | 3/2008 | Franaszek et al. | |

(Continued)

OTHER PUBLICATIONS

Mittal, "A Survey of Techniques for Cache Partitioning in Multicore Processors", ACM Computing Surveys, vol. 0, No. 0, Article , Publication date: 2017 (38 Pages).

(Continued)

*Primary Examiner* — Michelle T Bechtold
(74) *Attorney, Agent, or Firm* — Griffiths & Seaton PLLC (57) ABSTRACT

Various embodiments are provided for enabling data compression in a computing system by a processor. Each storage block of a storage device associated with a queue may be split. Compression of data may be activated upon data occupancy within a queue exceeding a dynamic threshold. In one aspect, only a partial amount of the data is fetched, back to back, from a divided storage block in the storage block according to the queue based upon the data occupancy within the queue exceeding the dynamic threshold. A complete amount of the data may be fetched from the divided storage block in a storage block according to the queue upon the data occupancy within the queue being less than dynamic threshold.

9 Claims, 9 Drawing Sheets

(56) References Cited

U.S. PATENT DOCUMENTS

| | | | |
|---|---|---|---|
| 2010/0061376 A1* | 3/2010 | Shimizu | H04L 49/103 370/395.7 |
| 2011/0314231 A1* | 12/2011 | O'Connor | G06F 12/04 711/154 |
| 2016/0085289 A1* | 3/2016 | Khatib | G06F 3/0653 713/320 |
| 2018/0074949 A1 | 3/2018 | Verrilli et al. | |

OTHER PUBLICATIONS

Alizadeh et al. "Less is more: trading a little bandwidth for ultra-low latency in the data center." Proceedings of the 9th USENIX conference on Networked Systems Design and Implementation. USENIX Association, 2012. (14 Pages).

* cited by examiner

ENABLING COMPRESSION BASED ON QUEUE OCCUPANCY

BACKGROUND OF THE INVENTION

Field of the Invention

The present invention relates in general to computing systems, and more particularly to, various embodiments for enabling data compression based on queue occupancy according to occupancy of a queue using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and/or retrieving various amounts of information is a key problem to solve.

SUMMARY OF THE INVENTION

Various embodiments for enabling data compression in a computing system according to occupancy of a queue by a processor are provided. Each storage block of a storage device associated with a queue may be split. Compression of data may be activated upon data occupancy within a queue exceeding a dynamic threshold. In one aspect, only a partial amount of the data is fetched, back-to-back, from a divided storage block in the storage block according to the queue based upon the data occupancy within the queue exceeding the dynamic threshold. A complete amount of the data may be fetched from the divided storage block in a storage block according to the queue upon the data occupancy within the queue being less than dynamic threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Increasing main memory bandwidth is instrumental for increasing the performance of processor chips and accelerators. Designers have traditionally improved bandwidth by increasing the frequency or the pin count of the memory interface. These techniques tend to have high storage area and energy costs. Furthermore, interface changes are slow, as new memory standards are proposed, for example, every 2 to 3 years. These challenges may be overcome by using data compression. That is, as memory systems become bandwidth constrained, data compression may be used to increase their effective bandwidth. Compression enables the memory systems to transfer data over fewer pins and fewer memory chips, thereby unlocking higher bandwidth. However, identifying if the data is compressed requires additional metadata. Also, data compression requires accessing metadata, which incurs additional bandwidth overheads. Even after using a metadata-cache, the bandwidth overheads of metadata can reduce the benefits of compression.

Thus, the metadata overheads involved in data compression can offset its bandwidth benefits. This is because each cache-line-size memory block from main memory will require a unique metadata to identify its compressibility. For a high capacity memory system, it is impractical to store the metadata in a memory controller. For instance, in a 16 gigabyte ("GB") memory system, if each cache-line requires 1 bit of metadata, then the memory controller will need 32 MB of storage. Therefore, metadata tends to be stored in a separate location within the main memory and tends to require issuing an additional memory request. The bandwidth overhead of metadata may be reduced by employing a small metadata-cache within the memory controller. Additionally, in spite of employing compression, the presence of uncompressible data can potentially increase the effective memory traffic by 25%. Unfortunately, additional metadata-cache eviction and install requests can reduce the performance benefits of data compression.

Accordingly, the present invention provides a solution to reduce all metadata access by enabling data compression in a computing system according to occupancy of a memory queue. Each storage block of a storage device associated with a queue may be split. Compression of data may be activated upon data occupancy within a queue exceeding a dynamic threshold. In one aspect, only a partial amount of the data is fetched, back-to-back, from a divided storage block in the storage block according to the queue based upon the data occupancy within the queue exceeding the dynamic threshold. A complete amount of the data may be fetched from the divided storage block in a storage block according to the queue upon the data occupancy within the queue being less than dynamic threshold. The dynamic threshold may be determined according to a channel frequency, number of banks, ranks, bank groups, or a combination thereof.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
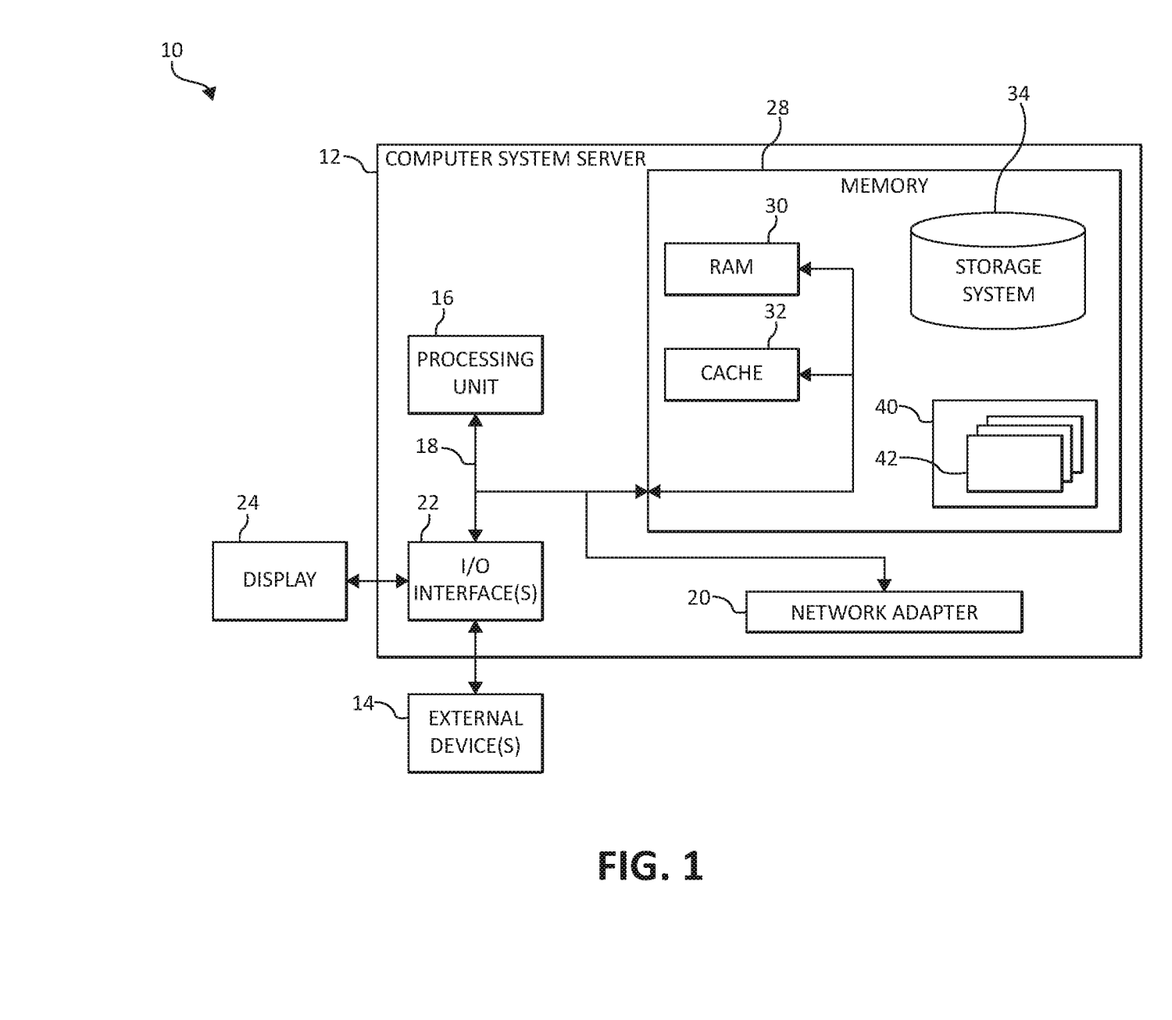
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
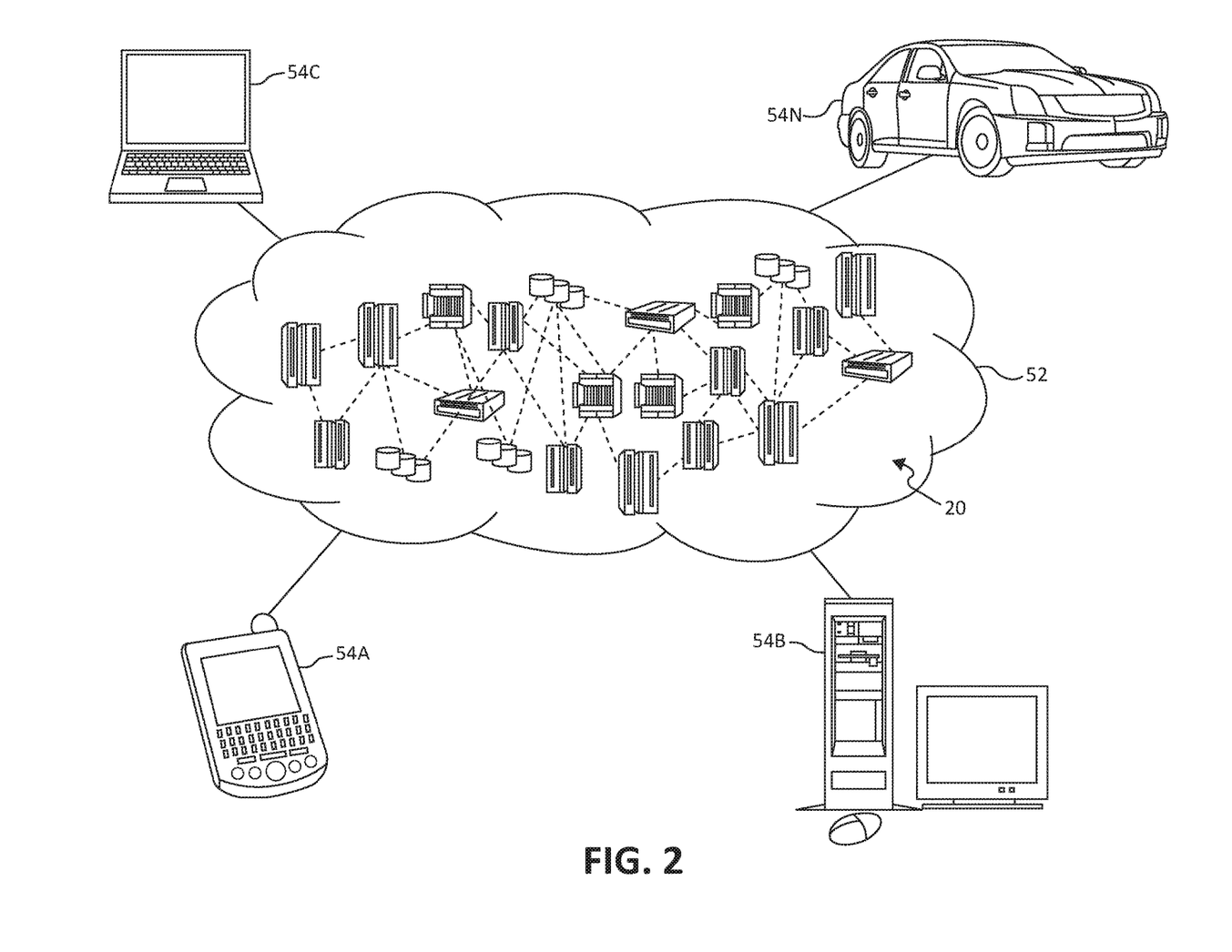
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
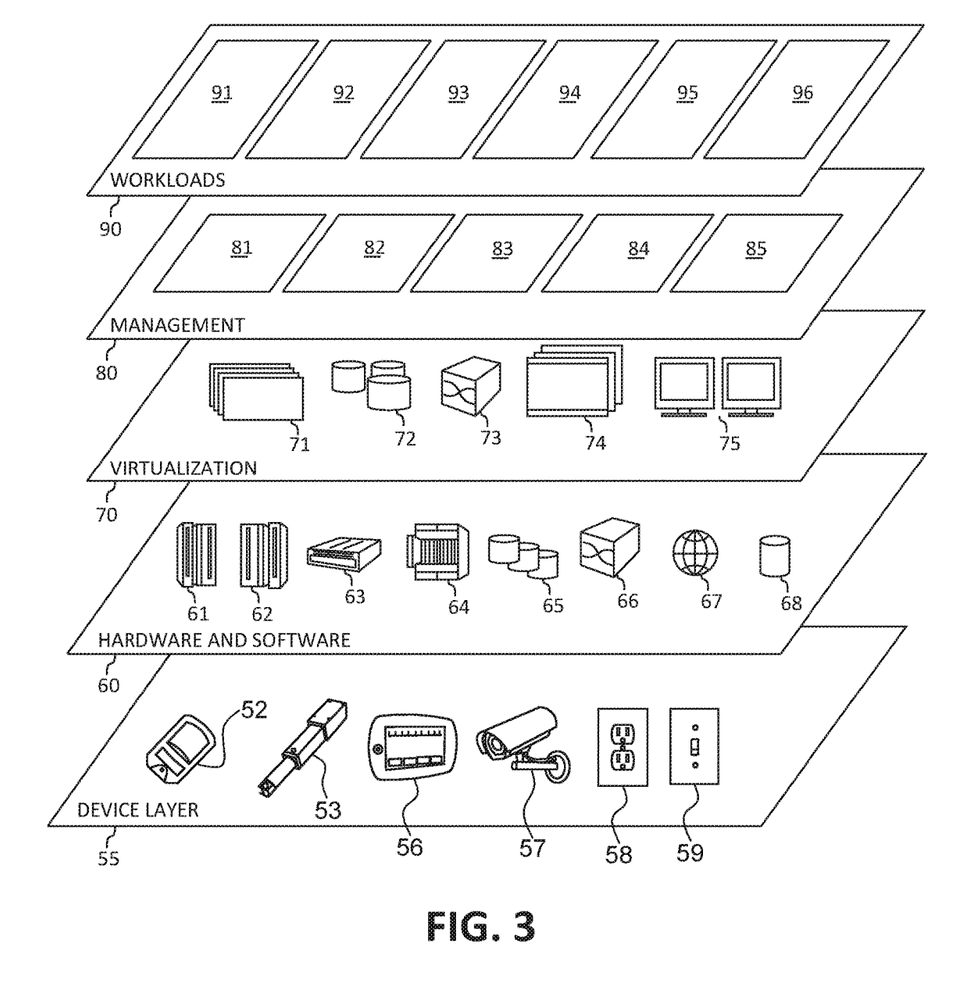
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for enabling data compression based on queue occupancy in a computing environment. In addition, workloads and functions 96 for enabling data compression based on queue occupancy in a computing environment may include such operations as data analysis (including data collection and processing from various environmental sensors) and/or analytics operations. One of ordinary skill in the art will appreciate that the workloads and functions 96 for enabling data compression based on queue occupancy in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
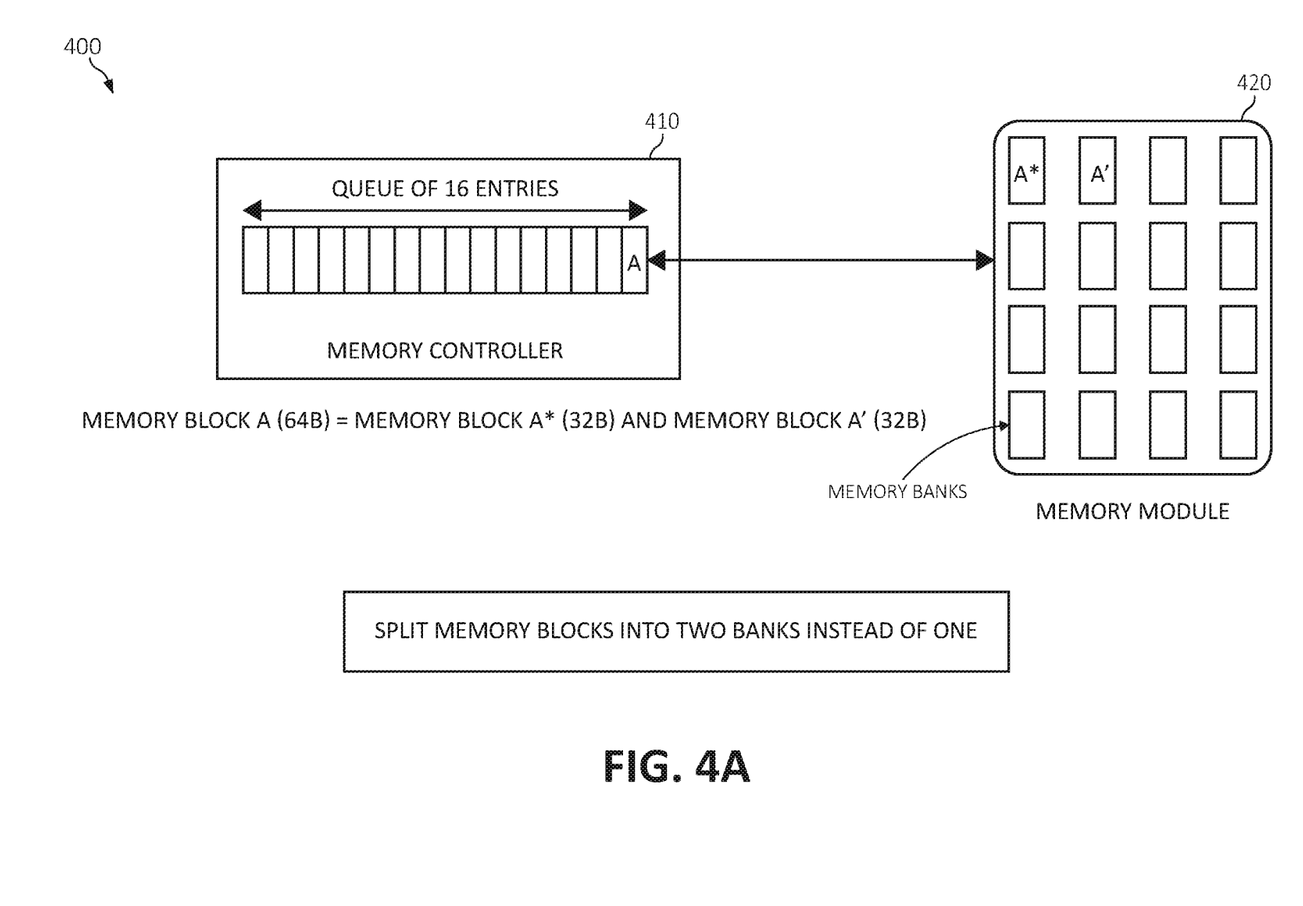
FIGS. 4A-C are additional block diagrams depicting uses of a memory queue for enabling data compression based on queue occupancy in which aspects of the present invention may be realized.
Figure 4B:
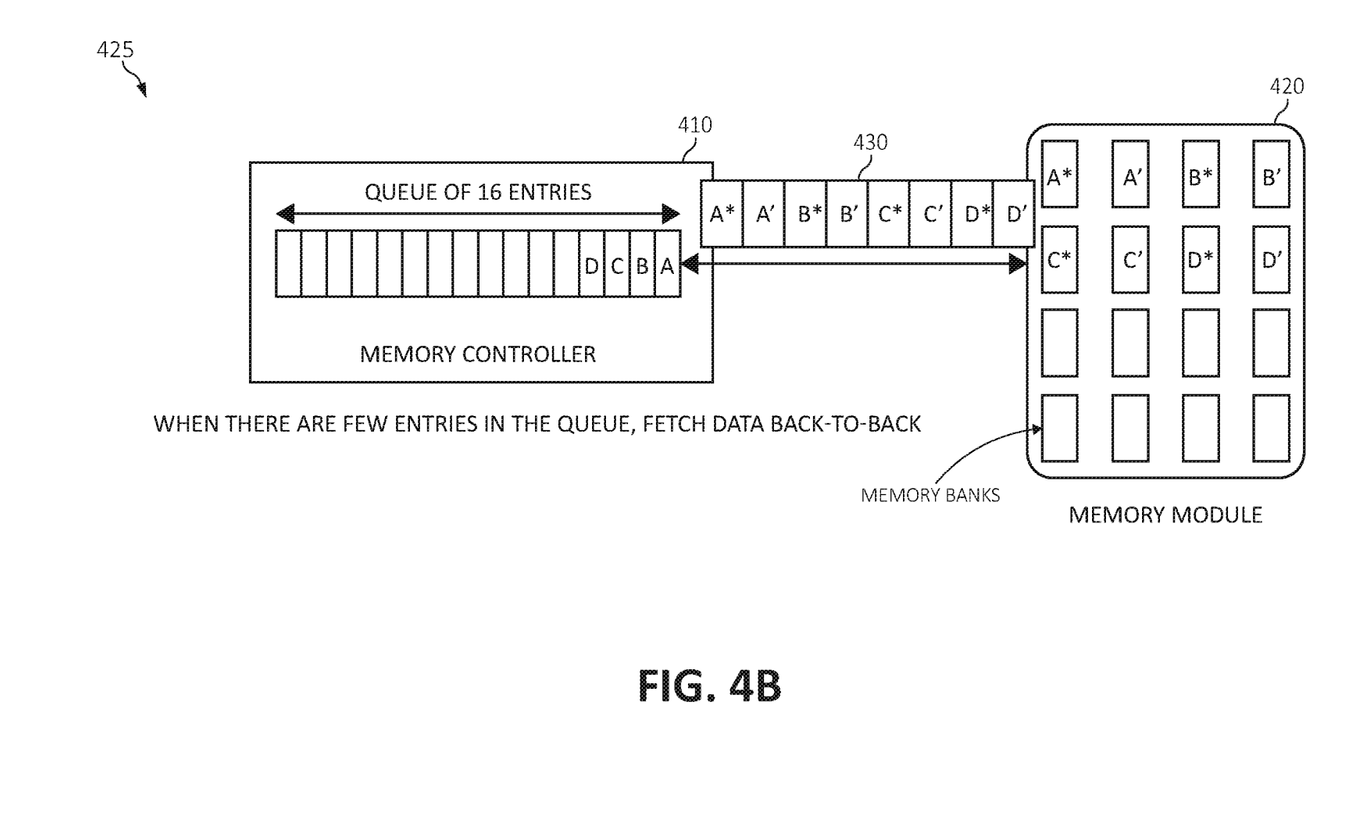
Figure 4C:
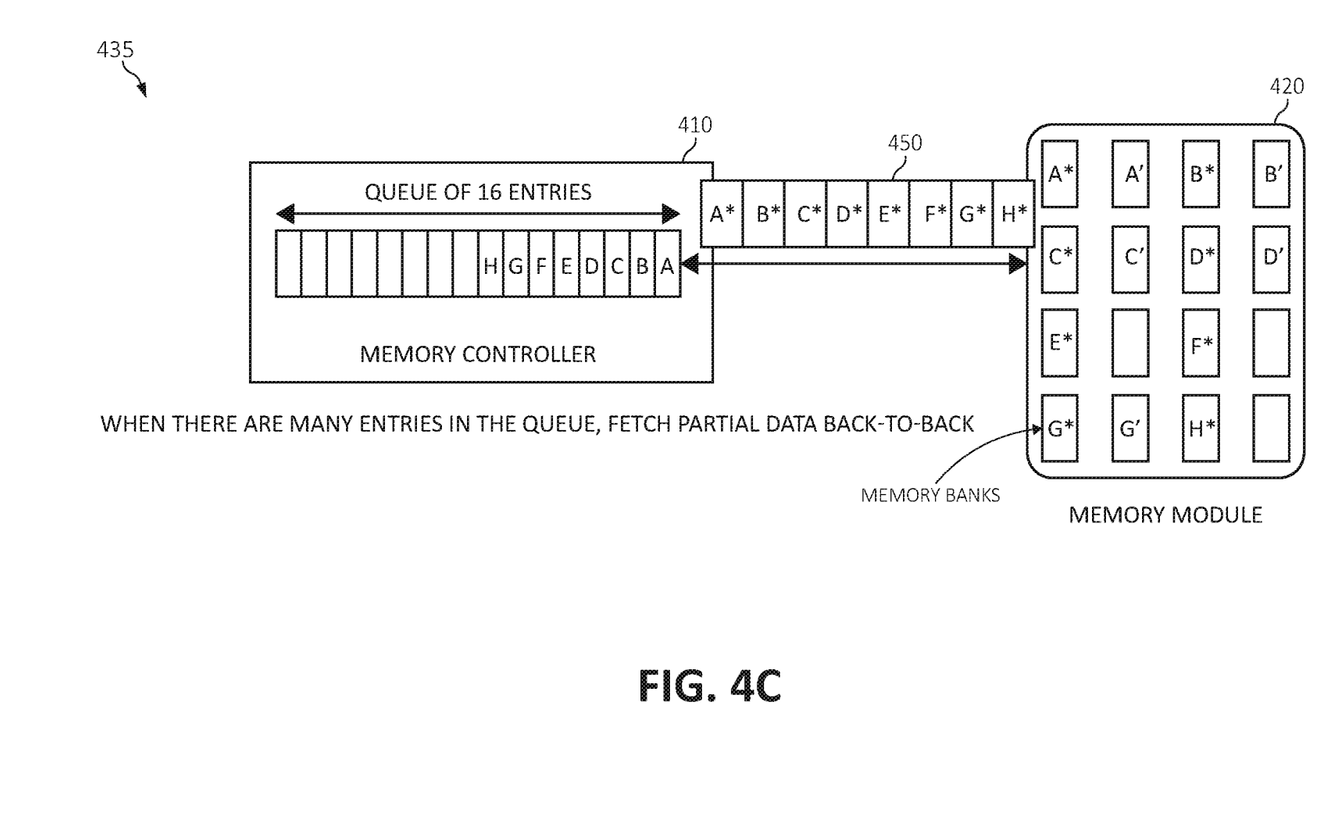

As previously mentioned, the mechanisms of the illustrated embodiments provide novel approaches for enabling data compression based on queue occupancy in a computing environment. Turning now to FIGS. 4A-4C, block diagrams 400, 425, and 435 depicts a memory controller 410 and a storage device 420 (e.g., a memory module) such as, for example, dynamic random-access memory ("DRAM"), synchronous DRAM ("SDRAM"), etc. In one aspect, one or more of the components, modules, services, applications, and/or functions described in FIGS. 1-3 may be used in FIG. 4. For example, the memory controller 410 and a storage device 420 may be components internal and/or external to computer system/server 12.

As illustrated, the memory controller 410 may have a queue of 16 entries. The storage device 420 may include one or more memory banks. The queue of the memory controller 410 may be used as an indicator to determine when to enable or disable compression. As illustrated in FIG. 4A, each of the memory blocks may be split into two memory banks (e.g., memory block * and memory block') rather than one memory bank. For example, memory block A may be 64 B (bytes). Memory block A may be split into memory block A* and memory block A' each of which are 32B.

A dynamic threshold may be used to determine when to enable or disable compression by determine if the number of entries in the queue is equal to, greater than, or less than the dynamic threshold. As illustrated in FIG. 4B, when the number of entries (e.g., data and/or input/output "I/O" occupying the number of entries in the queue) are less than the dynamic threshold, the data may be retrieved/fetched back-to-back to utilize the entire bandwidth when the requirement is small (e.g., less than the dynamic threshold). For example, the number of requests in the queue for A, B, C, and D are less than the dynamic threshold. Thus, each split memory block may be read back-to-back. For example, memory block A* (32B) and memory block A' (32B) may each be retrieved/fetched/read, then memory block B* (32B) and memory block B' (32B) may each be retrieved/fetched/read, then memory block C* (32B) and memory block C' (32B) may each be retrieved/fetched/read, and finally memory block D* (32B) and memory block D' (32B) may each be retrieved/fetched/read.

However, upon the number of the number of entries in the queue being greater than the dynamic threshold, only a select number of memory blocks (e.g., a partial amount of data) is retrieved/fetched/read back-to-back, as in FIG. 4C. That is, when the bandwidth requirement is large (e.g., the number of entries in the queue may determine the bandwidth requirement of the application), only the uncompressed memory blocks are retrieved/fetched/read as shown in stream 450. For example, only the uncompressed split memory of memory block A* (32B) is retrieved/fetched/read, then uncompressed split memory of memory block B* (32B) is retrieved/fetched/read, then uncompressed split memory of memory block C* (32B) is retrieved/fetched/read, then uncompressed split memory of memory block D* (32B) is retrieved/fetched/read, then uncompressed split memory of memory block E* (32B) is retrieved/fetched/read, then uncompressed split memory of memory block F* (32B) is retrieved/fetched/read, then uncompressed split memory of memory block G* (32B) is retrieved/fetched/read, and then finally uncompressed split memory of memory block H* (32B) is retrieved/fetched/read. That is, each stream depicts the queue and additional requests are not required from for memory block E*, memory block F*, and memory block H* because they are compressed and so only one access is required.

Figure 5:
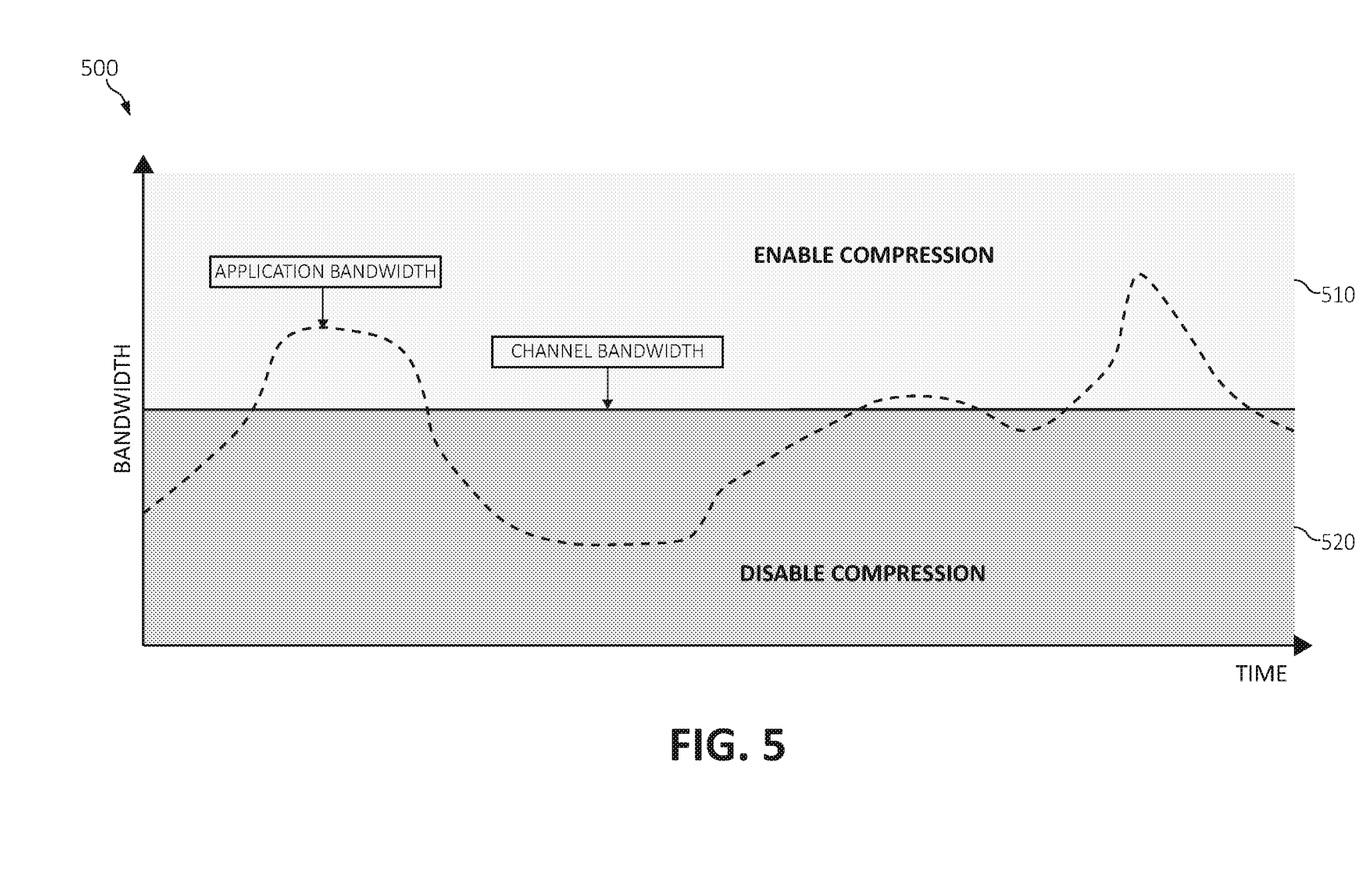
FIG. 5 is a graph diagram depicting enabling or disabling data compression based on queue occupancy in relation to channel bandwidth in a computing system in accordance with aspects of the present invention.

Turning now to FIG. 5, graph 500 depicts enabling or disabling data compression based on queue occupancy in relation to channel bandwidth in a computing system. In one aspect, one or more of the components, modules, services, applications, and/or functions described in FIGS. 1-4 may be used in FIG. 5.

As illustrated, graph 500 depicts bandwidth on the y-axis and time illustrated on the x-axis. An application bandwidth requirement is illustrated as a dashed line with a channel bandwidth depicted as a dynamic threshold. That is, compression may be disabled as the requirement for application bandwidth is below the channel bandwidth in section 520. Alternatively, compression may be enabled as the application bandwidth is above the channel bandwidth in section

510. The dynamic threshold may be determined by a maximum available channel bandwidth.

Figure 6:
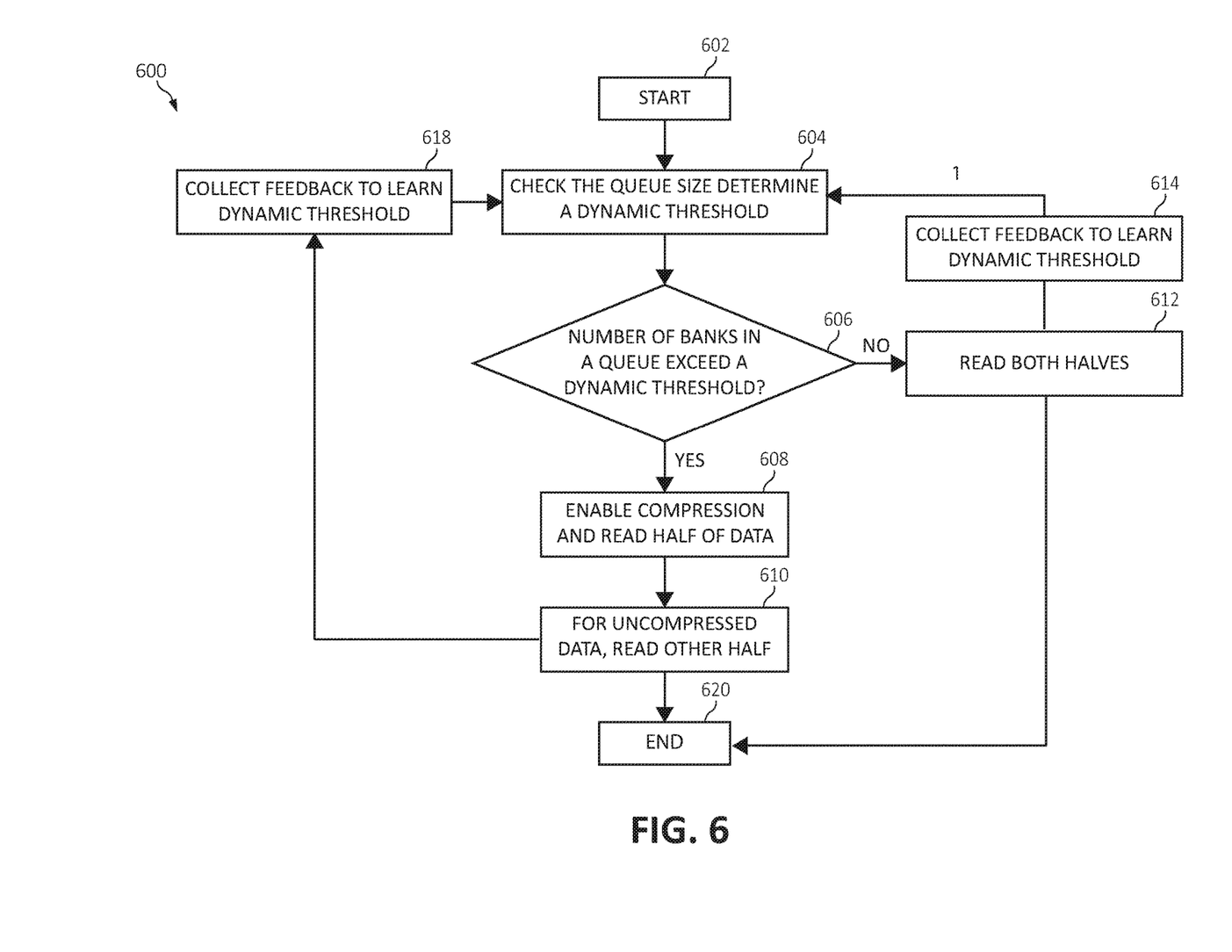
FIG. 6 is a flowchart diagram depicting an exemplary method for enabling data compression based on queue occupancy in a computing system in which aspects of the present invention may be realized.

Turning now to FIG. 6, a method 600 for enabling data compression based on queue occupancy is depicted, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. A queue size of a queue and a dynamic threshold may be determined/checked, as in block 604. A determination operation may be performed to determine if the number of banks in the queue exceeds the dynamic threshold, as in block 606. If yes at block 606, the functionality 600 may move to block 608. At block 608, data compression may be enabled and data from half of a split memory block may be read. For uncompressed data, the other half of the split memory block may be read, as in block 610. From block 610, the functionality 600 may move to block 618 and/or block 620. Feedback data may be collected to learn and update the dynamic threshold, as in block 618.

From block 618, the functionality 600 may move to block 604. Returning to block 606, if the number of banks in the queue does not exceed the dynamic threshold, both halves of a split memory block may be read, as in block 612. From block 612, the functionality 600 may move to block 614 and/or block 620. From block 612, feedback data may be collected to learn and update the dynamic threshold, as in block 614. From block 614, the functionality 600 may move to block 604. The functionality 600 may end in block 620.

Figure 7:
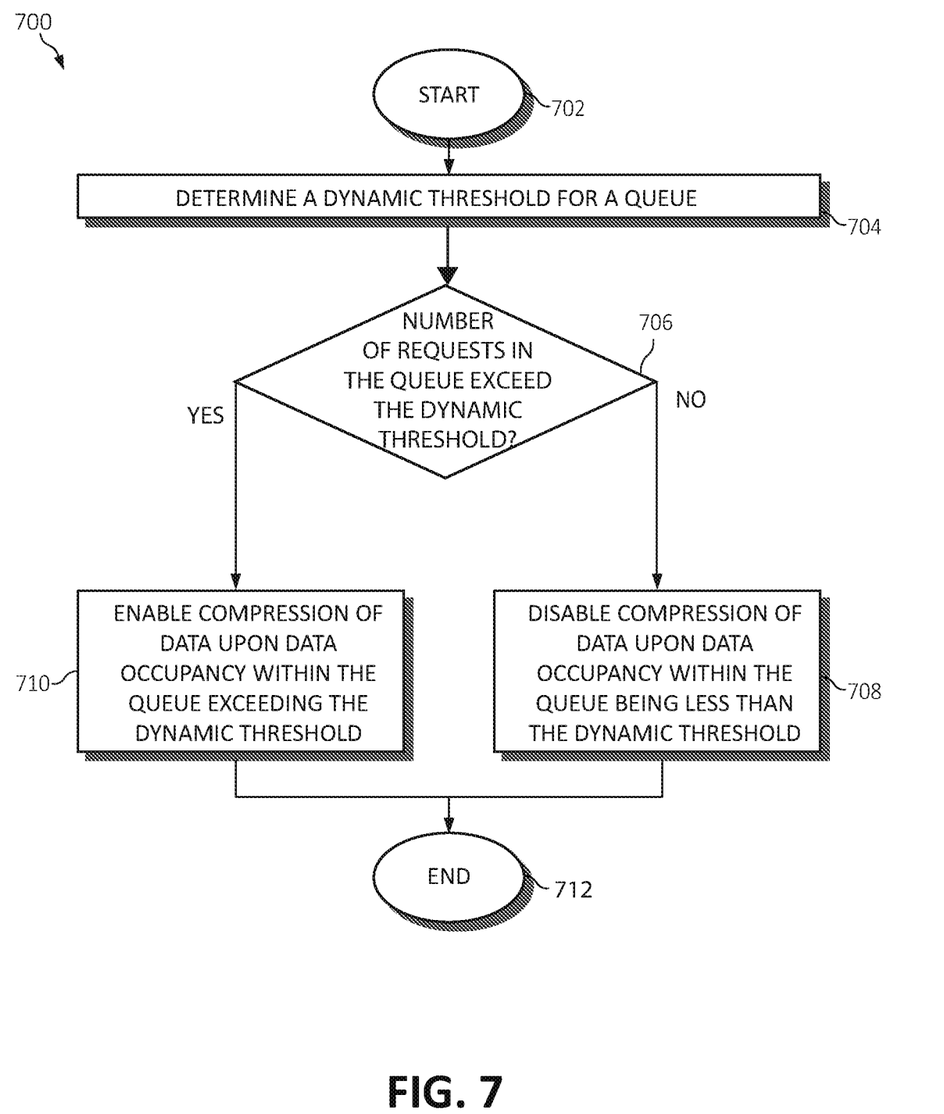
FIG. 7 is a flowchart diagram depicting an exemplary method for enabling data compression based on queue occupancy in a computing system in which aspects of the present invention may be realized.

Turning now to FIG. 7, a method 700 for enabling data compression based on queue occupancy is depicted, in which various aspects of the illustrated embodiments may be implemented. The functionality 700 may be implemented as a method executed as instructions on a machine, where the instructions are included on at least one computer readable medium or on a non-transitory machine-readable storage medium.

The functionality 700 may start in block 702. A dynamic threshold may be determined for a queue (e.g., a memory queue of a memory controller), as in block 704. The functionality 700 may move from block 704 to block 706. A determination operation may be performed to determine whether or not a number or requests in the queue exceed the dynamic threshold, as in block 706. If no at block 706, compression of data may be disabled upon data occupancy within the queue being less than the dynamic threshold, as in block 708. If yes at block 706, compression of data may be enabled upon data occupancy within the queue exceeding the dynamic threshold, as in block 710. The functionality 700 may end in block 712.

In one aspect, in conjunction with and/or as part of at least one block of FIGS. 6-7, the operation of methods 600 and/or 700 may include each of the following. The operation of functionality 600 and/or 700 may split each data storage block, in a storage device associated with the queue, into a first storage block and a second storage block and determine the data occupancy within the queue exceeds the dynamic threshold. The dynamic threshold may be dynamically defined according to feedback from a storage device.

The operation of functionality 600 and/or 700 may fetch data from a first storage block and a second storage block upon the data occupancy within the queue being less than dynamic threshold, wherein the first storage block and the storage block being created from a single storage block, and enable data compression and fetch only data from the first storage block or the second storage block upon the data occupancy within the queue exceeding the dynamic threshold, wherein the first storage block and the storage block being created from a single storage block.

The operation of functionality 600 and/or 700 may split each storage block of a storage device associated with the queue, fetch, back to back, only a partial amount of the data from a divided memory block in a storage block according to the queue upon the data occupancy within the queue exceeding the dynamic threshold, and/or fetch a complete amount of the data from the divided memory block in a storage block according to the queue upon the data occupancy within the queue being less than dynamic threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for enabling data compression, comprising:
dividing each storage block of a storage device associated with a queue of a memory controller into a first storage block and a second storage block;
responsive to receiving a read request for data, determining whether a data occupancy within the queue of the memory controller exceeds a dynamic threshold, wherein the dynamic threshold is used instead of issuing an additional read request to access metadata stored in a separate location of a storage device;
responsive to determining the data occupancy within the queue exceeds the dynamic threshold, enabling data compression and consecutively retrieving only the first storage block of each divided storage block of the data associated with the read request, wherein the first storage block of each divided storage block is read under compression while returning the first storage block of each divided storage block to a requestor, and wherein, for uncompressed data of the data associated with the read request, the second storage block of each divided storage block of the data is consecutively retrieved from the storage device only subsequent to retrieving each first storage block of each divided storage block associated with the read request; and
responsive to determining the data occupancy within the queue does not exceed the dynamic threshold, consecutively retrieving each of the divided storage blocks of the data associated with the read request.

2. A system for enabling data compression, comprising:
one or more computers with executable instructions that when executed cause the system to:
divide each storage block of a storage device associated with a queue of a memory controller into a first storage block and a second storage block;
responsive to receiving a read request for data, determine whether a data occupancy within the queue of the memory controller exceeds a dynamic threshold, wherein the dynamic threshold is used instead of issuing an additional read request to access metadata stored in a separate location of a storage device;
responsive to determining the data occupancy within the queue exceeds the dynamic threshold, enable data compression and consecutively retrieve only the first storage block of each divided storage block of the data associated with the read request, wherein the first storage block of each divided storage block is read under compression while returning the first storage block of each divided storage block to a requestor, and wherein, for uncompressed data of the data associated with the read request, the second storage block of each divided storage block of the data is consecutively retrieved from the storage device only subsequent to retrieving each first storage block of each divided storage block associated with the read request; and
responsive to determining the data occupancy within the queue does not exceed the dynamic threshold, consecutively retrieve each of the divided storage blocks of the data associated with the read request.

3. A computer program product for enabling data compression by a processor, the computer program product comprising a non-transitory computer-readable storage medium having computer-readable program code portions stored therein, the computer-readable program code portions comprising:

an executable portion that divides each storage block of a storage device associated with a queue of a memory controller into a first storage block and a second storage block;

an executable portion that, responsive to receiving a read request for data, determines whether a data occupancy within the queue of the memory controller exceeds a dynamic threshold, wherein the dynamic threshold is used instead of issuing an additional read request to access metadata stored in a separate location of a storage device;

an executable portion that, responsive to determining the data occupancy within the queue exceeds the dynamic threshold, enables data compression and consecutively retrieves only the first storage block of each divided storage block of the data associated with the read request, wherein the first storage block of each divided storage block is read under compression while returning the first storage block of each divided storage block to a requestor, and wherein, for uncompressed data of the data associated with the read request, the second storage block of each divided storage block of the data is consecutively retrieved from the storage device only subsequent to retrieving each first storage block of each divided storage block associated with the read request; and an executable portion that, responsive to determining the data occupancy within the queue does not exceed the dynamic threshold, consecutively retrieves each of the divided storage blocks of the data associated with the read request.

4. The method of claim 1, wherein the first storage block is comprised within a first memory bank of the storage device and the second storage block is comprised within a second memory bank of the storage device.

5. The method of claim 1, wherein the dynamic threshold is further determined according to a channel frequency, a number of banks, ranks, bank groups, or a combination thereof.

6. The system of claim 2, wherein the first storage block is comprised within a first memory bank of the storage device and the second storage block is comprised within a second memory bank of the storage device.

7. The system of claim 2, wherein the dynamic threshold is further determined according to a channel frequency, a number of banks, ranks, bank groups, or a combination thereof.

8. The computer program product of claim 3, wherein the first storage block is comprised within a first memory bank of the storage device and the second storage block is comprised within a second memory bank of the storage device.

9. The computer program product of claim 3, wherein the dynamic threshold is further determined according to a channel frequency, a number of banks, ranks, bank groups, or a combination thereof.

* * * * *